US012563410B2

(12) United States Patent
Rahman et al.

(10) Patent No.: US 12,563,410 B2
(45) Date of Patent: Feb. 24, 2026

(54) METHOD AND APPARATUS FOR MULTI-BEAM OPERATIONS

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 477 days.

(21) Appl. No.: 16/947,815

(22) Filed: Aug. 18, 2020

(65) Prior Publication Data

US 2021/0067979 A1     Mar. 4, 2021

Related U.S. Application Data

(60) Provisional application No. 62/937,525, filed on Nov. 19, 2019, provisional application No. 62/916,538, (Continued)

(51) Int. Cl.
H04W 16/28      (2009.01)
H04B 7/0408     (2017.01)
(Continued)

(52) U.S. Cl.
CPC .......... H04W 16/28 (2013.01); H04B 7/0408 (2013.01); H04B 7/0696 (2023.05); (Continued)

(58) Field of Classification Search
CPC ............. H04W 16/28; H04W 72/0413; H04W 72/042; H04B 7/0408; H04B 7/0695; H04L 5/001; H04L 5/0098; H04L 5/0053
See application file for complete search history.

(56) References Cited

U.S. PATENT DOCUMENTS 10,873,952 B2 * 12/2020 Wang .................... H04W 76/15
2018/0332520 A1 * 11/2018 Cheng ............... H04W 36/0016
(Continued)

FOREIGN PATENT DOCUMENTS

CN      113632393     *  3/2019  .......... H04B 7/0062
CN      109788564 A      5/2019
(Continued)

OTHER PUBLICATIONS

3GPP TSG-RAN WG2#101, R2-1803207 Title:On the immediate transmission (Year: 2018).*
(Continued)

*Primary Examiner* — Christopher M Crutchfield
*Assistant Examiner* — Abusayeed M Haque

(57) ABSTRACT

A method for operating a user equipment (UE) comprises receiving configuration information including a list of component carriers (CCs) and at least K transmission configuration indicator (TCI) states, where K>1 and each TCI state includes a TCI state identifier (ID) and a quasi co-location information (QCL-Info). The method further includes receiving an activation command via medium access control-control element (MAC-CE) to activate N TCI state IDs from K TCI state IDs, wherein N<K and the activation command is common across the list of CCs, determining a TCI state $T_i$ for a CC i in the list of CCs based on the activated N TCI state IDs, and transmitting an uplink (UL) transmission or receiving a downlink (DL) transmission for the CC i based on a QCL-Info included in the determined TCI state $T_i$.

15 Claims, 13 Drawing Sheets

Related U.S. Application Data filed on Oct. 17, 2019, provisional application No. 62/915,847, filed on Oct. 16, 2019, provisional application No. 62/893,697, filed on Aug. 29, 2019, provisional application No. 62/892,312, filed on Aug. 27, 2019.

(51) Int. Cl.

| | | |
|---|---|---|
| *H04B 7/06* | (2006.01) | |
| *H04L 5/00* | (2006.01) | |
| *H04W 72/0446* | (2023.01) | |
| *H04W 72/21* | (2023.01) | |
| *H04W 72/23* | (2023.01) | |

(52) U.S. Cl.

CPC ......... *H04B 7/06966* (2023.05); *H04L 5/001* (2013.01); *H04L 5/0053* (2013.01); *H04W 72/0446* (2013.01); *H04W 72/21* (2023.01); *H04W 72/23* (2023.01)

(56) References Cited

U.S. PATENT DOCUMENTS

| | | | |
|---|---|---|---|
| 2019/0090227 A1 | 3/2019 | Tsai et al. | |
| 2019/0174449 A1* | 6/2019 | Shan ..................... | H04W 60/04 |
| 2019/0174466 A1* | 6/2019 | Zhang ................... | H04L 5/0057 |
| 2019/0215701 A1* | 7/2019 | Honglei ............... | H04B 7/0617 |
| 2019/0215781 A1 | 7/2019 | Jeon et al. | |
| 2019/0230545 A1 | 7/2019 | Liou et al. | |
| 2019/0239093 A1 | 8/2019 | Zhang et al. | |
| 2019/0239245 A1* | 8/2019 | Davydov .............. | H04L 5/0048 |
| 2019/0246395 A1 | 8/2019 | Huang et al. | |
| 2019/0281587 A1* | 9/2019 | Zhang ................... | H04W 72/23 |
| 2020/0053724 A1* | 2/2020 | MolavianJazi ....... | H04L 5/0048 |
| 2020/0053757 A1* | 2/2020 | Bagheri ................ | H04L 5/0007 |
| 2021/0044403 A1* | 2/2021 | Zhang ................... | H04W 72/20 |
| 2022/0150019 A1* | 5/2022 | Xiao ..................... | H04L 5/0053 |

FOREIGN PATENT DOCUMENTS

| | | | | |
|---|---|---|---|---|
| CN | 110062397 A | 7/2019 | | |
| EP | 3890205 A1 | 10/2021 | | |
| WO | WO-2010127316 | * 11/2010 | ............... | H04L 5/06 |
| WO | 2018143702 A1 | 8/2018 | | |
| WO | WO-2019136728 A1 | * 7/2019 | ........... | H04L 5/0053 |
| WO | WO-2020029725 A1 | * 2/2020 | ............. | H04L 5/001 |
| WO | WO-2020034889 A1 | * 2/2020 | ........... | H04B 7/0695 |

OTHER PUBLICATIONS

3GPP TSG-RAN WG2#102, R2-1808775 Title:Clearification of the usage of SN status transfer (Year: 2018).*

"3rd Generation Partnership Project; Technical Specification Group Radio Access Network; Evolved Universal Terrestrial Radio Access (E-UTRA); Physical channels and modulation (Release 15)", 3GPP TS 36.211 V15.5.0, Mar. 2019, 238 pages.

"3rd Generation Partnership Project; Technical Specification Group Radio Access Network; Evolved Universal Terrestrial Radio Access (E-UTRA); Multiplexing and channel coding (Release 15)", 3GPP TS 36.212 V15.5.0, Mar. 2019, 246 pages.

"3rd Generation Partnership Project; Technical Specification Group Radio Access Network; Evolved Universal Terrestrial Radio Access (E-UTRA); Physical layer procedures (Release 15)", 3GPP TS 36.213 V15.5.0, Mar. 2019, 552 pages.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.5.0, Mar. 2019, 131 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.5.0, Mar. 2019, 944 pages.

"3rd Generation Partnership Project; Technical Specification Group Radio Access Network; NR; Physical channels and modulation (Release 15)", 3GPP TS 38.211 V15.5.0, Mar. 2019, 96 pages.

"3rd Generation Partnership Project; Technical Specification Group Radio Access Network; NR; Multiplexing and channel coding( Release 15)", 3GPP TS 38.212 V15.5.0, Mar. 2019, 101 pages.

"3rd Generation Partnership Project; Technical Specification Group Radio Access Network; NR; Physical layer procedures for control (Release 15)", 3GPP TS 38.213 V15.5.0, Mar. 2019, 104 pages.

"3rd Generation Partnership Project; Technical Specification Group Radio Access Network; NR; Physical layer procedures for data (Release 15)", 3GPP TS 38.214 V15.5.0, Mar. 2019, 103 pages.

"3rd Generation Partnership Project; Technical Specification Group Radio Access Network; NR; Physical layer measurements, (Release 15)", 3GPP TS 38.215 V15.5.0, Jun. 2019, 16 pages.

"3rd Generation Partnership Project; Technical Specification Group Radio Access Network; NR; Medium Access Control (MAC) protocol specification, (Release 15)", 3GPP TS 38.321 V15.5.0, Mar. 2019, 78 pages.

"3rd Generation Partnership Project; Technical Specification Group Radio Access Network; NR; Radio Resource Control (RRC) protocol specification, (Release 15)", 3GPP TS 38.331 V15.5.0, Mar. 2019, 491 pages.

CATT, "Correction on timing for MAC CE applicability with HARQ-ACK repetition in 38.214", Change Request, 3GPP TSG-RAN WG1 Meeting #98, Aug. 26-30, 2019, R1-1908565, 11 pages.

Intel Corporation, "Discussion on multi-beam enhancements", 3GPP TSG RAN WG1 #98, Aug. 26-30, 2019, R1-1908654, 16 pages.

Sony, "Enhancements on multi-beam operation", 3GPP TSG RAN WG1#98 meeting, Aug. 26-30, 2019, R1-1908784, 9 pages.

ZTE, "Enhancements on multi-beam operation", 3GPP TSG RAN WG1 Meeting #98, Aug. 26-30, 2019, R1-1908192, 26 pages.

Notification of Transmittal of the International Search Report and The Written Opinion of the International Searching Authority, or the Declaration dated Nov. 25, 2020 in connection with International Patent Application No. PCT/KR2020/011373, 10 pages.

Extended European Search Report issued Feb. 28, 2022 regarding Application No. 20857716.3, 8 pages.

LG Electronics, "Feature lead summary#3 of Enhancements on Multi-beam Operations", 3GPP TSG RAN WG1 Meeting #97, R1-1907860, May 2019, 35 pages.

Qualcomm Incorporated, "Enhancements on Multi-beam Operation", 3GPP TSG-RAN WG1 Meeting #97, R1-1907290, May 2019, 26 pages.

Qualcomm Incorporated, "Enhancements on Multi-beam Operation", 3GPP TSG-RAN WG1 Meeting #98, R1-1909273, Aug. 2019, 19 pages.

Chinese National Intellectual Property Administration, Office Action issued Sep. 26, 2023 regarding Application No. 202080017513.7, 14 pages.

ZTE, "Enhancements on multi-beam operation", 3GPP TSG RAN WG1 Meeting #98, R1-1908192, Aug. 2019, 26 pages.

LG Electronics, "Feature lead summary of Enhancements on Multi-beam Operations", 3GPP TSG RAN WG1 Meeting #97, R1-1907650, May 2019, 33 pages.

European Patent Office, Communication pursuant to Article 94(3) EPC issued Feb. 6, 2024 regarding Application No. 20857716.3, 8 pages.

Chinese National Intellectual Property Administration, Office Action issued Mar. 28, 2024 regarding Application No. 202080017513.7, 22 pages.

European Patent Office, Communication pursuant to Article 94(3) EPC issued Oct. 15, 2024 regarding application No. 20857716.3, 7 pages.

Korean Intellectual Property Office, Office Action issued Jul. 1, 2025 regarding Application No. 10-2022-7009971, 11 pages.

Chinese National Intellectual Property Administration, Office Action issued Jun. 29, 2024 regarding Application No. 202080017513.7, 13 pages.

* cited by examiner

700

800

1000

Without beam correspondence:
DL-TCI links target CSI-RS with reference AP-CSI-RS

With beam correspondence:
DL-TCI links target CSI-RS with reference AP-SRS

1200

Without beam correspondence:
UL TCI links target SRS with reference AP-SRS

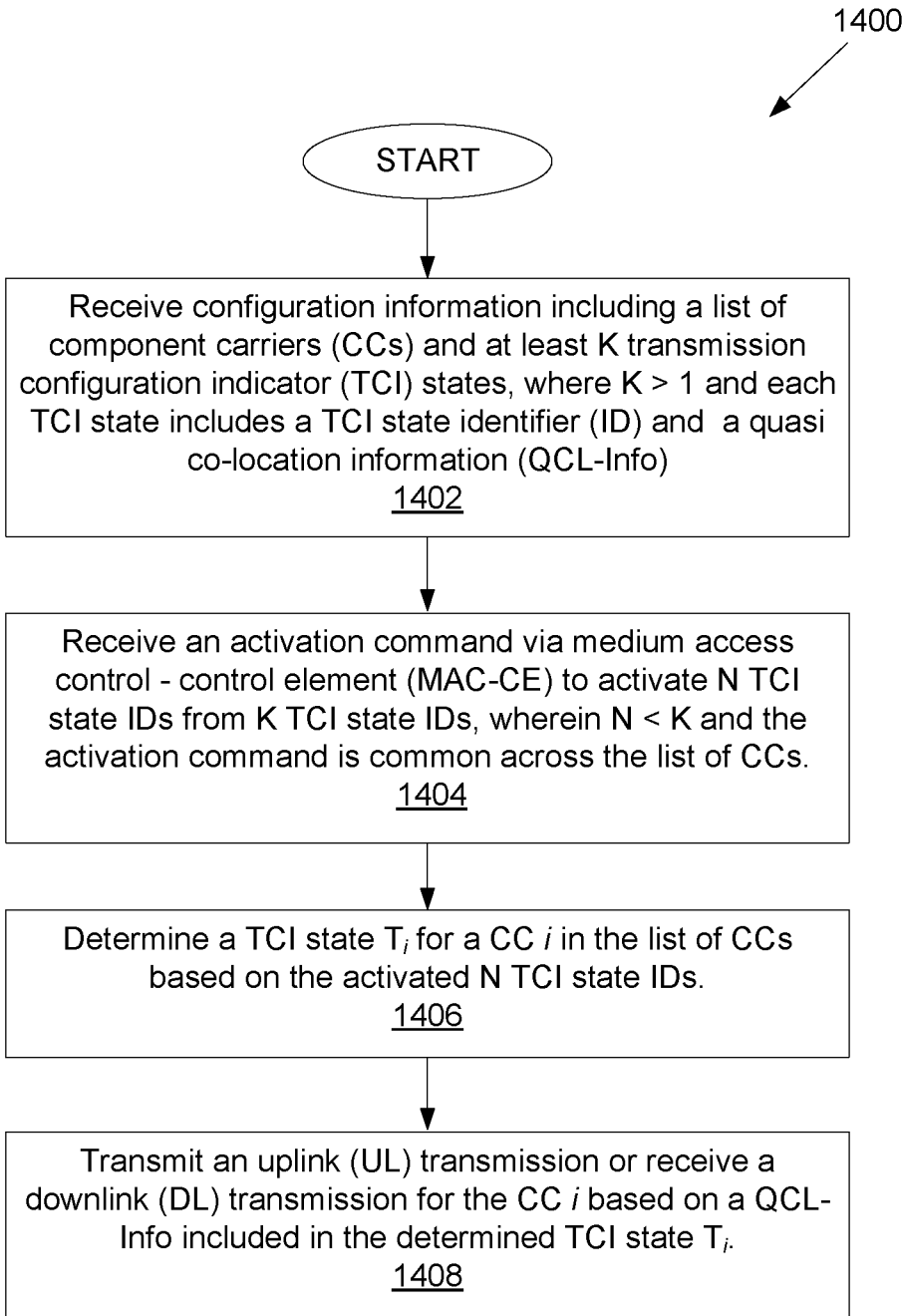

1400

START

Receive configuration information including a list of
component carriers (CCs) and at least K transmission
configuration indicator (TCI) states, where K > 1 and each
TCI state includes a TCI state identifier (ID) and a quasi
co-location information (QCL-Info)
1402

Receive an activation command via medium access
control - control element (MAC-CE) to activate N TCI
state IDs from K TCI state IDs, wherein N < K and the
activation command is common across the list of CCs.
1404

Determine a TCI state $T_i$ for a CC $i$ in the list of CCs
based on the activated N TCI state IDs.
1406

Transmit an uplink (UL) transmission or receive a
downlink (DL) transmission for the CC $i$ based on a QCL-
Info included in the determined TCI state $T_i$.
1408

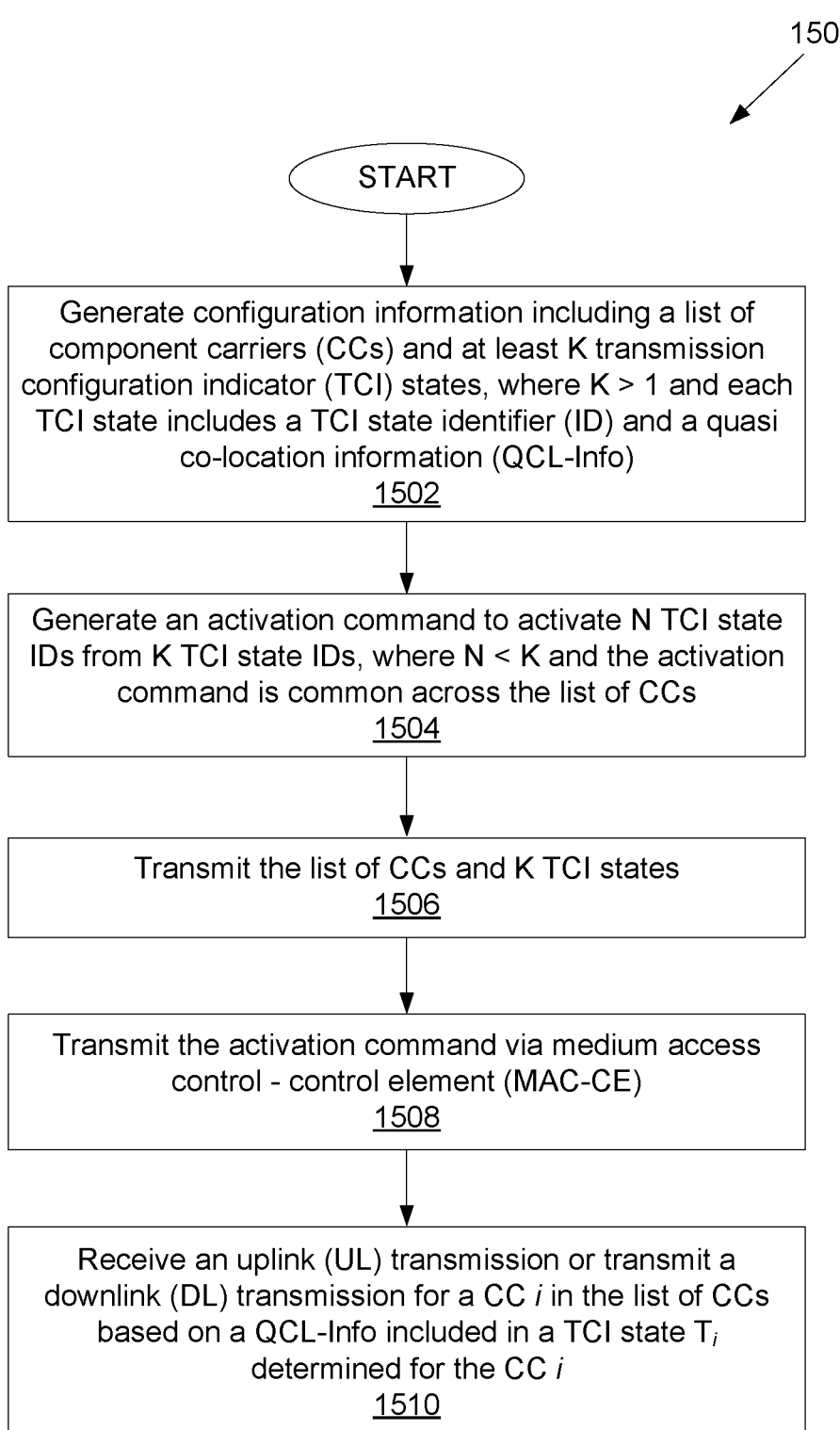

START

Generate configuration information including a list of component carriers (CCs) and at least K transmission configuration indicator (TCI) states, where K > 1 and each TCI state includes a TCI state identifier (ID) and a quasi co-location information (QCL-Info)
1502

Generate an activation command to activate N TCI state IDs from K TCI state IDs, where N < K and the activation command is common across the list of CCs
1504

Transmit the list of CCs and K TCI states
1506

Transmit the activation command via medium access control - control element (MAC-CE)
1508

Receive an uplink (UL) transmission or transmit a downlink (DL) transmission for a CC $i$ in the list of CCs based on a QCL-Info included in a TCI state $T_i$ determined for the CC $i$
1510

FIG. 15

METHOD AND APPARATUS FOR MULTI-BEAM OPERATIONS

CROSS-REFERENCE TO RELATED APPLICATIONS AND CLAIM OF PRIORITY

The present application claims priority to U.S. Provisional Patent Application No. 62/892,312, filed on Aug. 27, 2019, U.S. Provisional Patent Application No. 62/893,697 filed on Aug. 29, 2019, U.S. Provisional Patent Application No. 62/915,847 filed on Oct. 16, 2019, U.S. Provisional Patent Application No. 62/916,538 filed on Oct. 17, 2019, and U.S. Provisional Patent Application No. 62/937,525 filed on Nov. 19, 2019. The content of the above-identified patent documents is incorporated herein by reference.

TECHNICAL FIELD

The present disclosure relates generally to wireless communication systems and more specifically to downlink and uplink multi-beam operation in a wireless communication system.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment (UE) can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two-dimensional array transmit antennas or, in general, antenna array geometry which accommodates a large number of antenna elements.

SUMMARY

Embodiments of the present disclosure provide methods and apparatuses to enable downlink and uplink multi-beam operation in a wireless communication system.

In one embodiment, a UE is provided. The UE comprises a transceiver configured to receive configuration information including a list of component carriers (CCs) and at least K transmission configuration indicator (TCI) states, wherein K>1 and each TCI state includes a TCI state identifier (ID) and a quasi co-location information (QCL-Info), and receive an activation command via medium access control-control element (MAC-CE) to activate N TCI state IDs from K TCI state IDs, wherein N<K and the activation command is common across the list of CCs. The UE further includes a processor operably connected to the transceiver. The processor is configured to determine a TCI state $T_i$ for a CC i in the list of CCs based on the activated N TCI state IDs. The transceiver further is configured to transmit an uplink (UL)

transmission or receive a downlink (DL) transmission for the CC i based on a QCL-Info included in the determined TCI state $T_i$.

In another embodiment, a BS in a wireless communication system is provided. The BS includes a processor configured to generate configuration information including a list of component carriers (CCs) and at least K transmission configuration indicator (TCI) states, wherein K>1 and each TCI state includes a TCI state identifier (ID) and a quasi co-location information (QCL-Info). The processor is further configured to generate an activation command to activate N TCI state IDs from K TCI state IDs, wherein N<K and the activation command is common across the list of CCs. The BS further includes a transceiver operably coupled to the processor. The transceiver is configured to transmit the list of CCs and K TCI states, transmit the activation command via medium access control-control element (MAC-CE), and receive an uplink (UL) transmission or transmit a downlink (DL) transmission for a CC i in the list of CCs based on a QCL-Info included in a TCI state $T_i$ determined for the CC i.

In yet another embodiment, a method for operating a UE is provided. The method comprises receiving configuration information including a list of component carriers (CCs) and at least K transmission configuration indicator (TCI) states, wherein K>1 and each TCI state includes a TCI state identifier (ID) and a quasi co-location information (QCL-Info), receiving an activation command via medium access control-control element (MAC-CE) to activate N TCI state IDs from K TCI state IDs, wherein N<K and the activation command is common across the list of CCs, determining a TCI state $T_i$ for a CC i in the list of CCs based on the activated N TCI state IDs, and transmitting an uplink (UL) transmission or receiving a downlink (DL) transmission for the CC i based on a QCL-Info included in the determined TCI state $T_i$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

4

Figure 11:
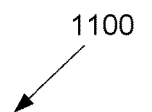
Figure 11:
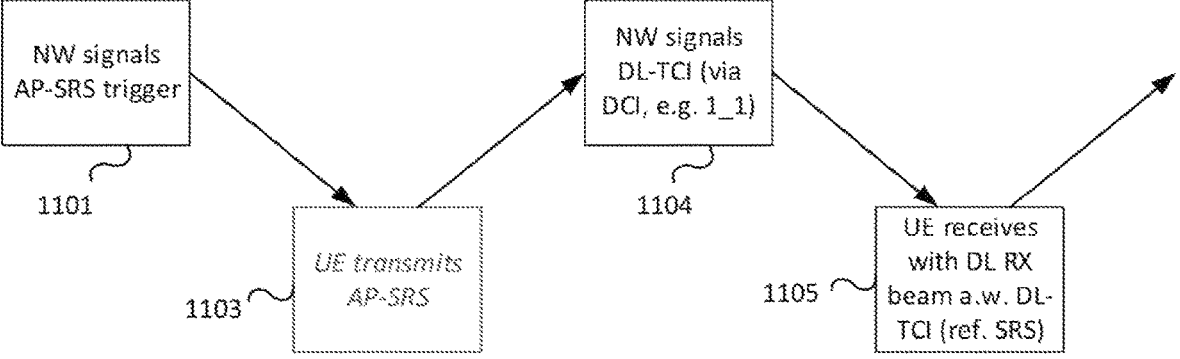
Figure 12:
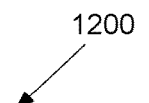
Figure 12:
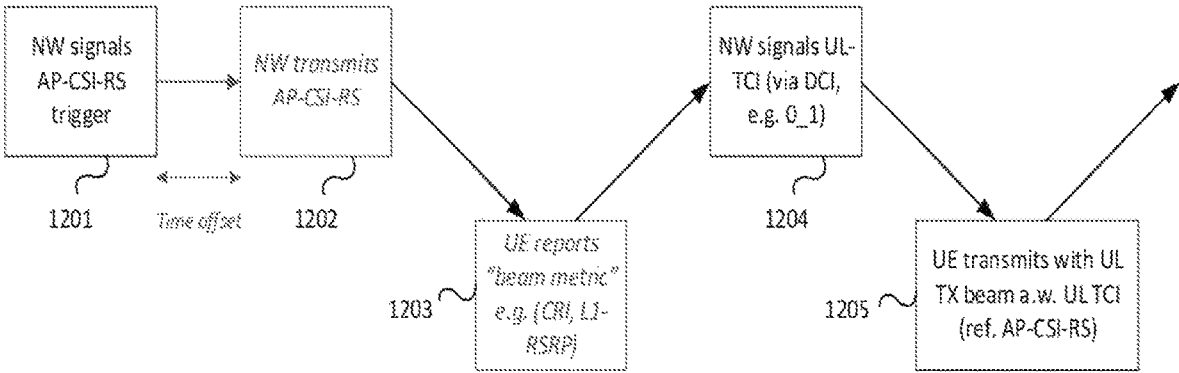
Figure 13:
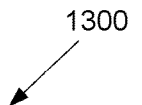
Figure 13:
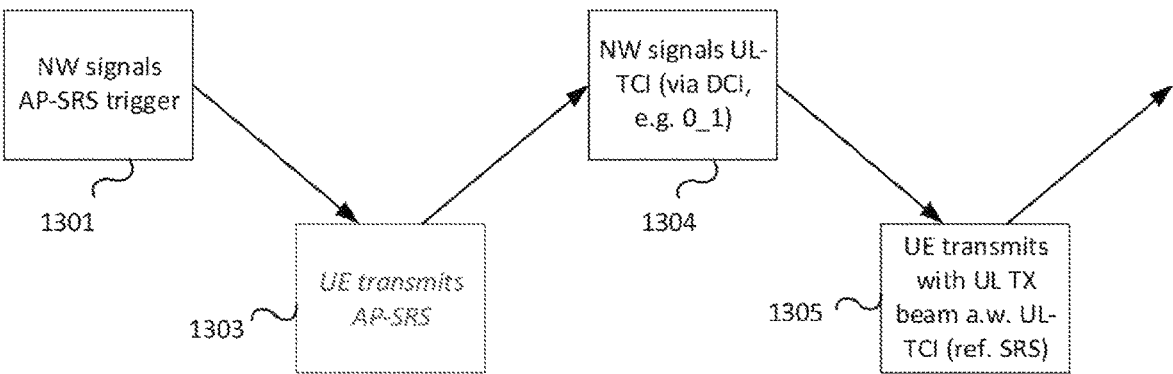

FIG. 11 illustrates a downlink multi-beam operation according to embodiments of the present disclosure;

FIG. 12 illustrates an uplink multi-beam operation according to embodiments of the present disclosure;

FIG. 13 illustrates an uplink multi-beam operation according to embodiments of the present disclosure;

FIG. 14 illustrates a flow chart of a method for operating a user equipment (UE) according to embodiments of the present disclosure; and FIG. 15 illustrates a flow chart of another method as may be performed by a base station (BS), according to embodiments of the present disclosure.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.2.0, "E-UTRA, Physical channels and modulation;" 3GPP TS 36.212 v16.2.0, "E-UTRA, Multiplexing and Channel coding;" 3GPP TS 36.213 v16.2.0, "E-UTRA, Physical Layer Procedures;" 3GPP TS 36.321 v16.2.0, "E-UTRA, Medium Access Control (MAC) protocol specification;" 3GPP TS 36.331 v16.2.0, "E-UTRA, Radio Resource Control (RRC) protocol specification;" 3GPP TR 22.891 v14.2.0; 3GPP TS 38.211 v16.2.0, "E-UTRA, NR, Physical channels and modulation;" 3GPP TS 38.213 v16.2.0, "E-UTRA, NR, Physical Layer Procedures for control;" 3GPP TS 38.214 v16.2.0, "E-UTRA, NR, Physical layer procedures for data;" and 3GPP TS 38.212 v16.2.0, "E-UTRA, NR, Multiplexing and channel coding."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates or in lower frequency bands, such as below 6 GHz, to enable robust coverage and mobility support. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

Figure 1:
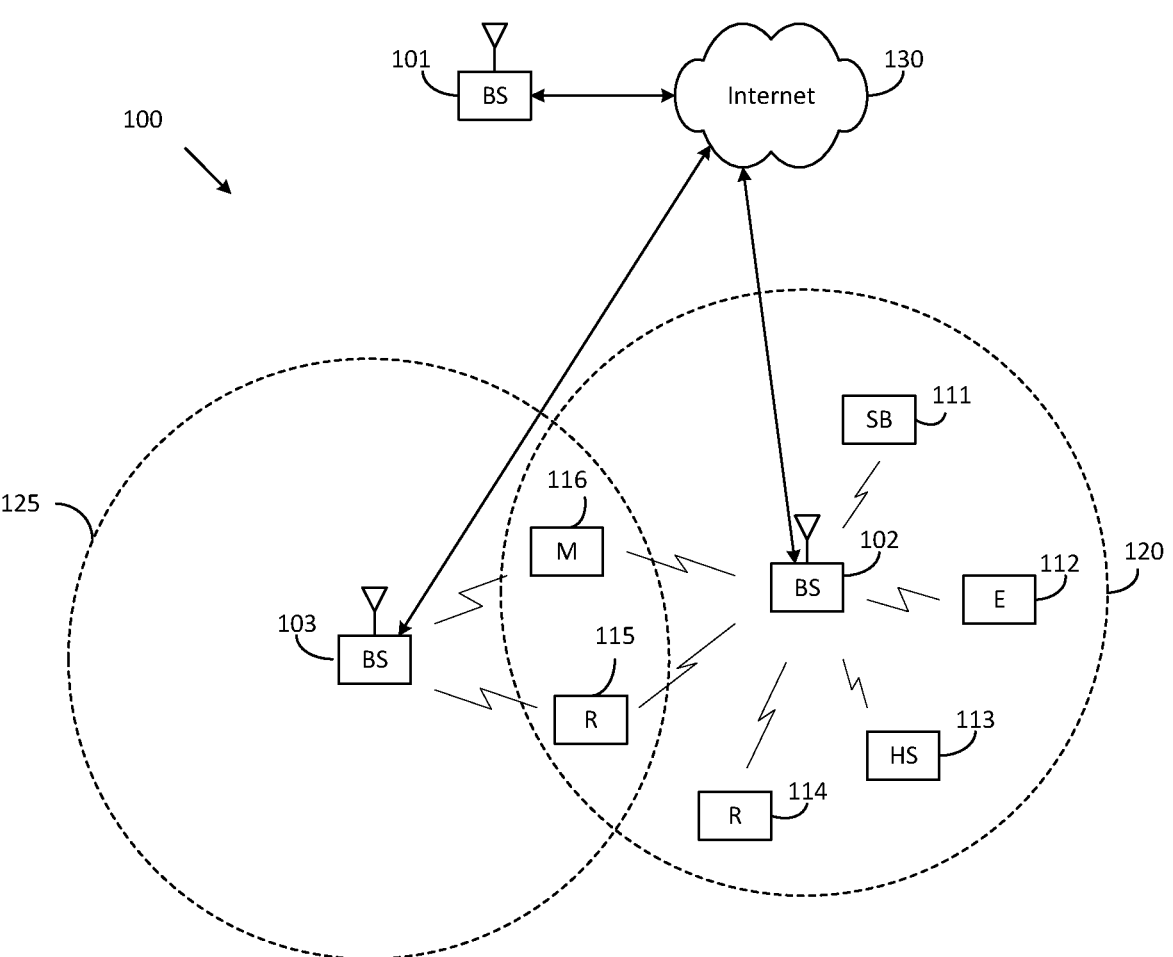
FIG. 1 illustrates an example wireless network according to embodiments of the present disclosure.
Figure 2:
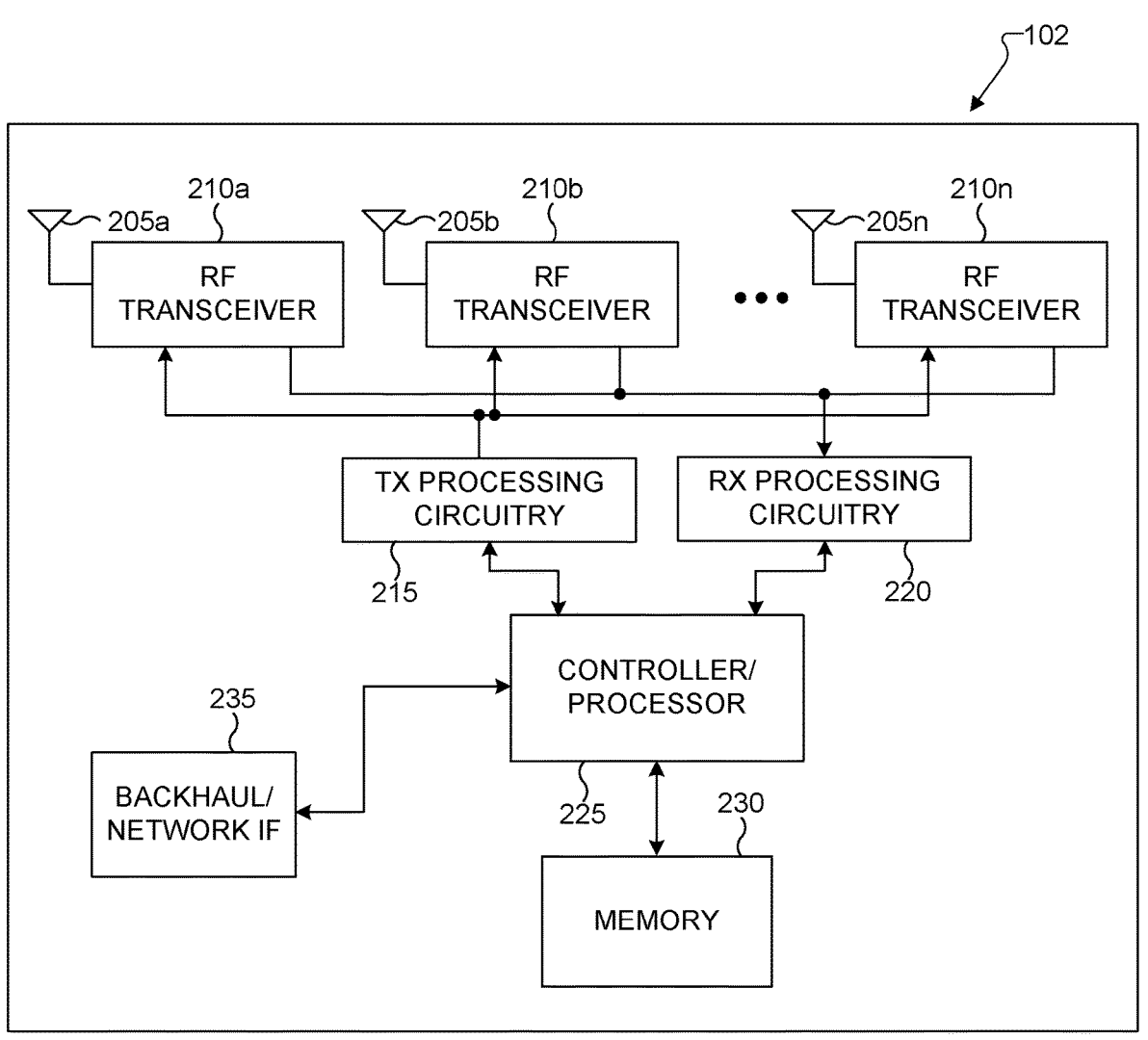
FIG. 2 illustrates an example gNB according to embodiments of the present disclosure.
Figure 3:
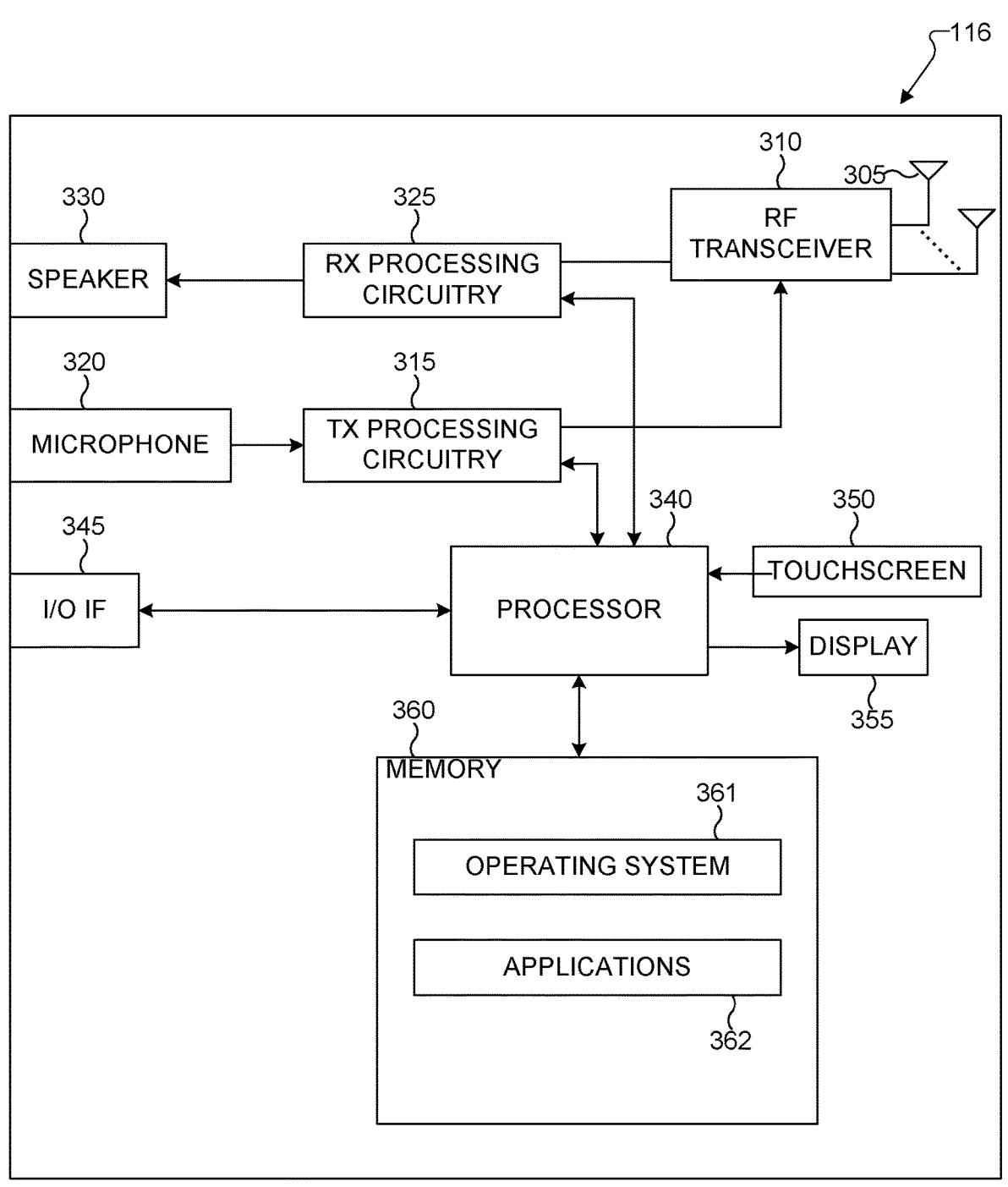
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 includes circuitry, programing, or a combination thereof, for receiving a list of component carriers (CCs) and K transmission configuration indicator (TCI) states and receiving an activation command via medium access control-control element (MAC-CE) to activate N TCI state IDs from K TCI state IDs, where the activation command is common across a list of CCs, and one or more of the gNBs 101-103 includes circuitry, programing, or a combination thereof, for transmitting the list of CCs and K TCI states and transmitting the activation command via the MAC-CE.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for determining a quasi-co-location (QCL) information for a component carrier (CC) to transmit UL transmission or receive DL transmission, wherein the QCL information corresponds to a spatial domain filter associated with a beam to transmit the UL transmission or receive the DL transmission. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
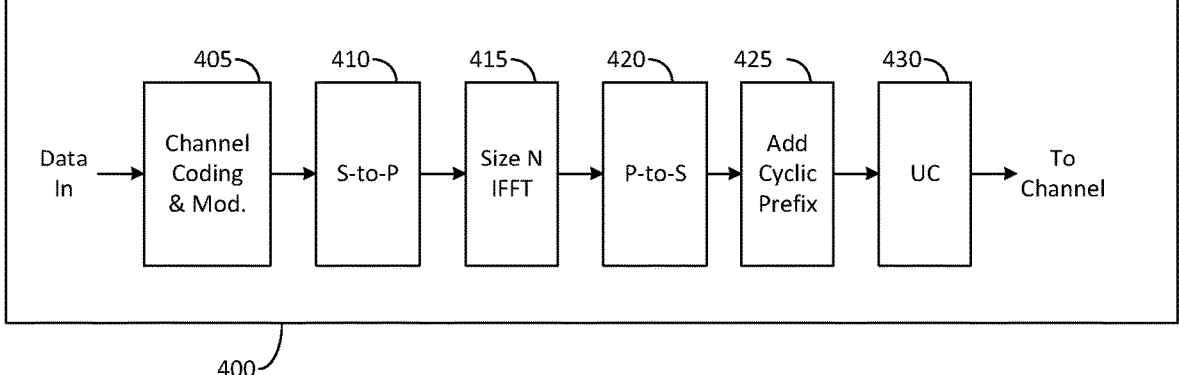
FIG. 4A illustrates a high-level diagram of an orthogonal frequency division multiple access transmit path according to embodiments of the present disclosure.
Figure 4B:
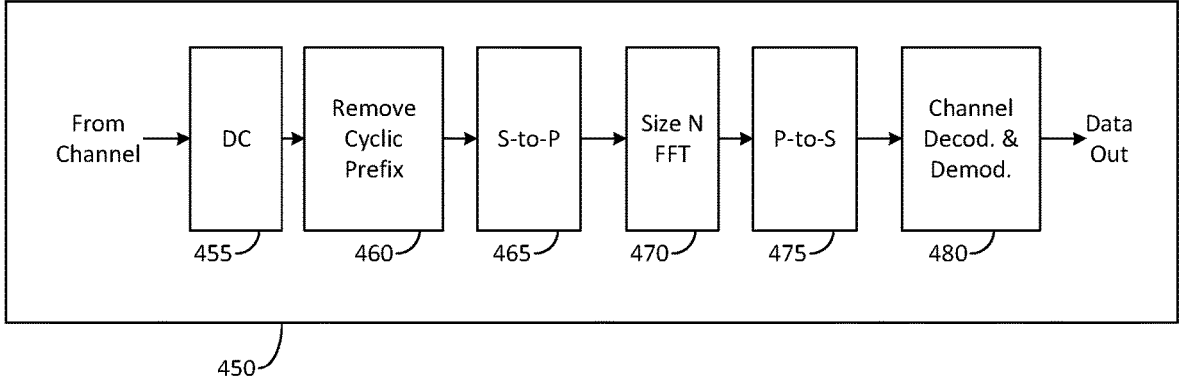
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

The 5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra-reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $N_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{sybm}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
FIG. 5 illustrates a transmitter block diagram for a PDSCH in a subframe according to embodiments of the present disclosure.
Figure 5:
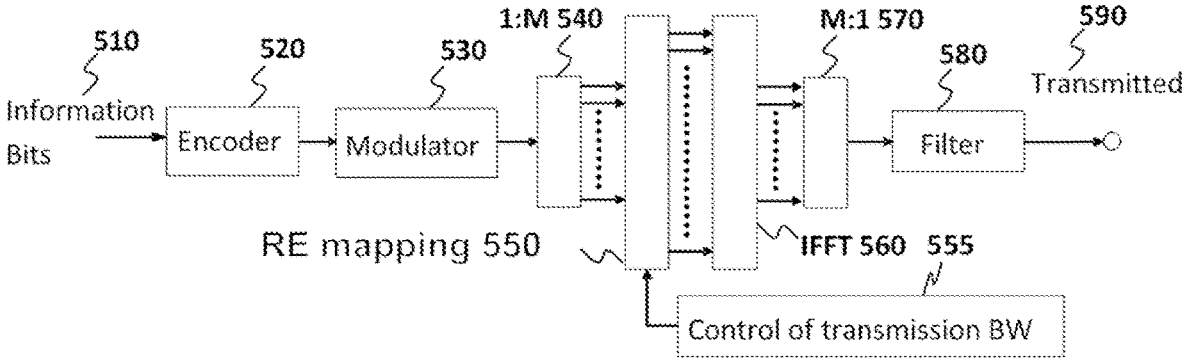

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
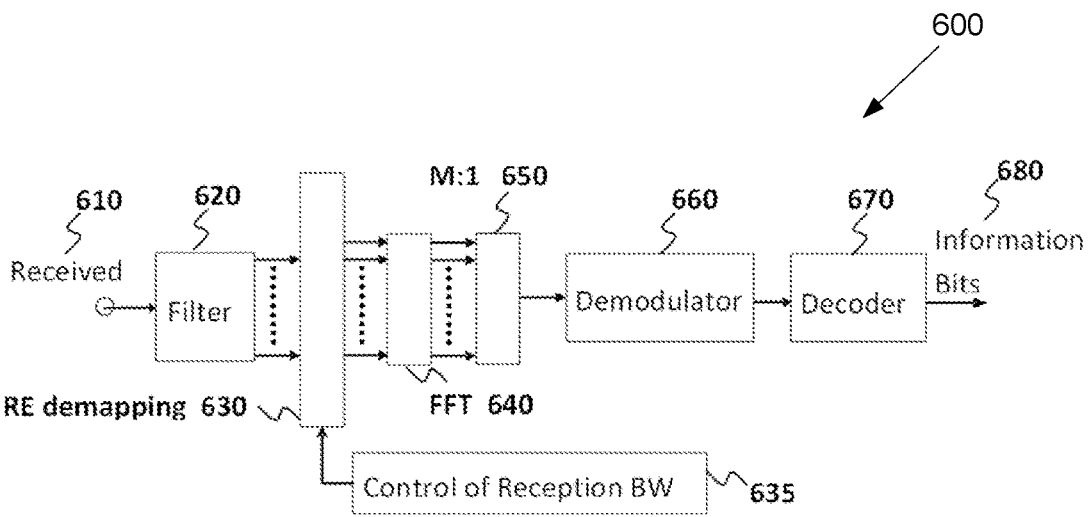
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
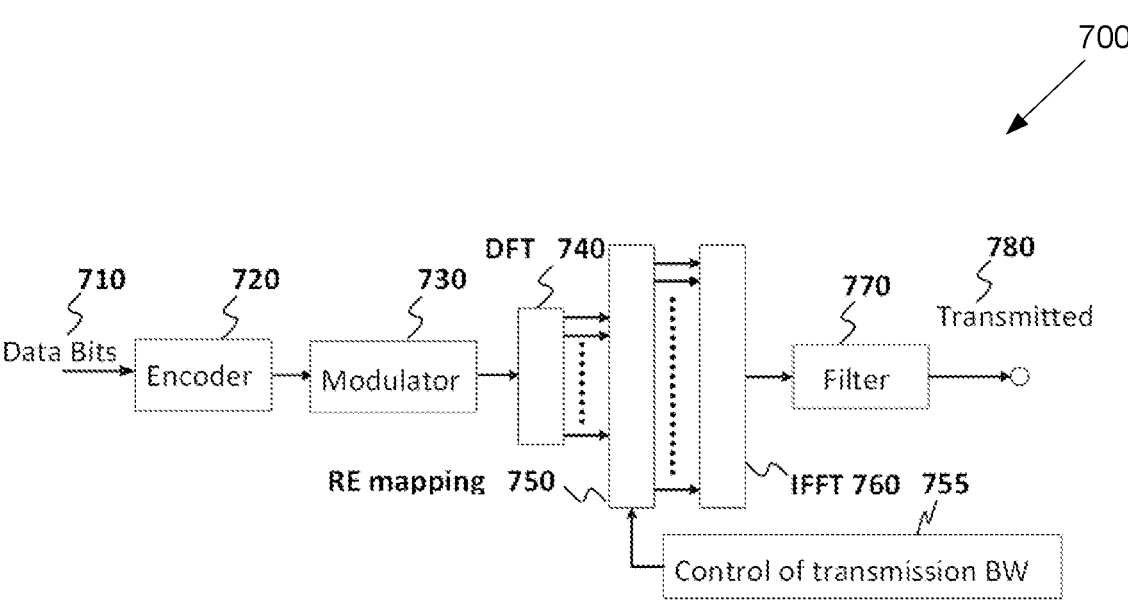
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
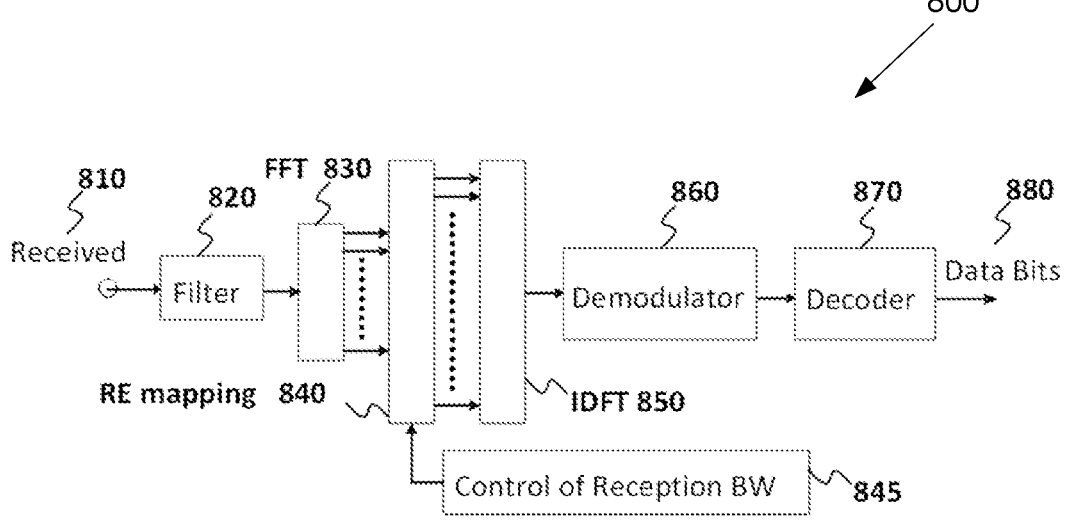
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
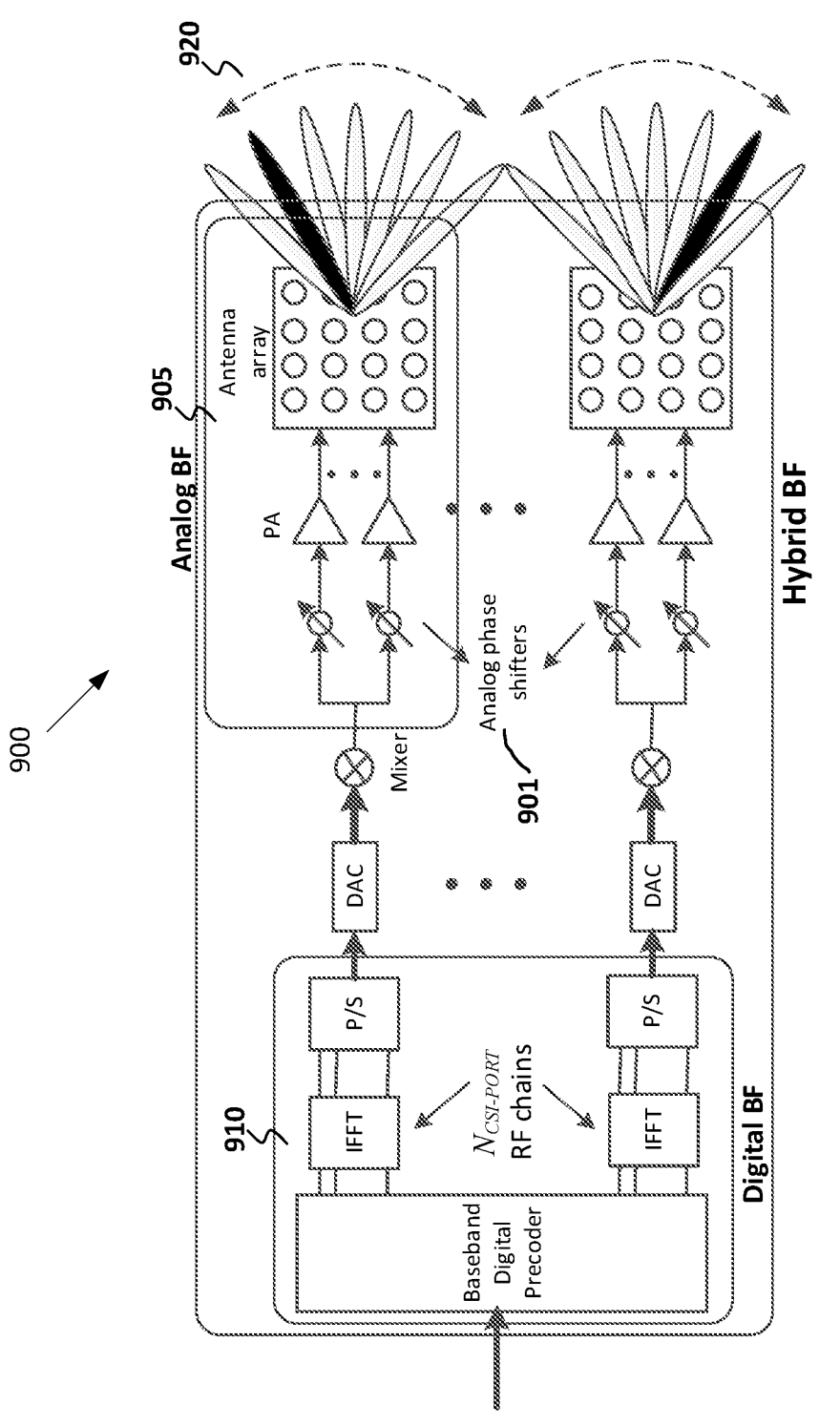
FIG. 9 illustrates an example antenna blocks according to embodiments of the present disclosure.

FIG. 9 illustrates an example antenna blocks 900 according to embodiments of the present disclosure. The embodiment of the antenna blocks 900 illustrated in FIG. 9 is for illustration only. FIG. 9 does not limit the scope of this disclosure to any particular implementation of the antenna blocks 900.

The 3GPP LTE and NR specifications support up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters

901. One CSI-RS port can then correspond to one sub-array which produces a narrow analog beam through analog beamforming 905. This analog beam can be configured to sweep across a wider range of angles 920 by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Because the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

In 5G NR systems, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

For multiple component carriers (CCs) or bandwidth parts (BWP) within a CC, the MAC-CE based activation and selection of a TCI state or a set of TCI states for DL beam indication is independent for each CC or BWP. For intra-band carrier aggregation (CA) on frequency range 2 (FR2), the maximum number of CCs is at least 8 and is expected to be even larger. The MAC-CE overhead (for TCI activation for multiple CCs/BWPs) is an issue. Another related issue is UE beam management complexity across CCs/BWPs. Therefore, there is a need to develop solutions for DL beam indication methods for multiple CCs/BWPs that can reduce MAC-CE overhead for TCI state indication and reduce UE beam management complexity across CCs/BWPs.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of UL TX beam or DL RX beam, such as direction, precoding/beamforming, number of ports, etc. For instance, for UL, as the UE receives a reference RS index/ID in an UL grant, the UE applies the known characteristics of the reference RS to the granted UL transmission. The reference RS can be received and measured by the UE (in this case, the reference RS is a downlink signal such as NZP CSI-RS and/or SSB) with the result of the measurement used for calculating a beam report. As the NW/gNB receives the beam report, the NW can be better equipped with information to assign a particular UL TX beam or DL RX beam to the UE. Optionally, the reference RS can be transmitted by the UE (in this case, the reference RS is a downlink signal such as SRS or DMRS). As the NW/gNB receives the reference RS, the NW/gNB can measure and calculate the needed information to assign a particular UL TX beam or DL RX beam to the UE.

The reference RS can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

There are two types of frequency range (FR) defined in 3GPP NR specifications. The sub-6 GHz range is called frequency range 1 (FR1) and millimeter wave range is called frequency range 2 (FR2). An example of the frequency range for FR1 and FR2 is shown below.

| Frequency range designation | Corresponding frequency range |
| --- | --- |
| FR1 | 450 MHz-6000 MHz |
| FR2 | 24250 MHz-52600 MHz |

For mmWave (or FR2) where multi-beam operation is especially relevant, transmission-reception process includes the receiver to select a receive (RX) beam for a given TX beam. For DL multi-beam operation, the UE selects a DL RX beam for every DL TX beam (which corresponds to a reference RS). Therefore, when DL RS (such as CSI-RS and/or SSB) is used as reference RS, the NW/gNB transmits the DL RS to the UE (which is associated with a selection of DL TX beam). In response, the UE measures the DL RS (and in the process selects a DL RX beam) and reports the beam metric associated with the quality of the DL RS. In this case, the UE determines the TX-RX beam pair for every configured (DL) reference RS. Therefore, although this knowledge is unavailable to the NW/gNB, the UE—upon receiving a DL RS (hence DL TX beam) indication from the NW/gNB—can select the DL RX beam from the knowledge on all the TX-RX beam pairs. On the other hand, when UL RS (such as SRS and/or DMRS) is used as reference RS (pertinent when DL-UL beam correspondence or reciprocity holds), the NW/gNB triggers or configures the UE to transmit the UL RS (for DL and by reciprocity, this corresponds to a DL RX beam). The gNB, upon receiving and measuring the UL RS, selects a DL TX beam. As a result, a TX-RX beam pair is derived. The NW/gNB can perform this operation for all the configured UL RSs (either per reference RS or "beam sweeping") and determine all the TX-RX beam pairs associated with all the UL RSs configured to the UE.

The following two embodiments (A-1 and A-2) are examples of DL multi-beam operations that utilize DL-TCI-based DL beam indication. In the first example embodiment (A-1), aperiodic CSI-RS is transmitted by the NW and measured by the UE. This embodiment can be used whether UL-DL beam correspondence holds or not. In the second example embodiment (A-2), aperiodic SRS is triggered by the NW and transmitted by the UE so that the NW (or a gNB) can measure the UL channel quality for the purpose of assigning a DL RX beam. This embodiment can be used when UL-DL beam correspondence holds. Although aperiodic RS is used in these two examples, periodic or semi-persistent RS can also be used.

Figure 10:
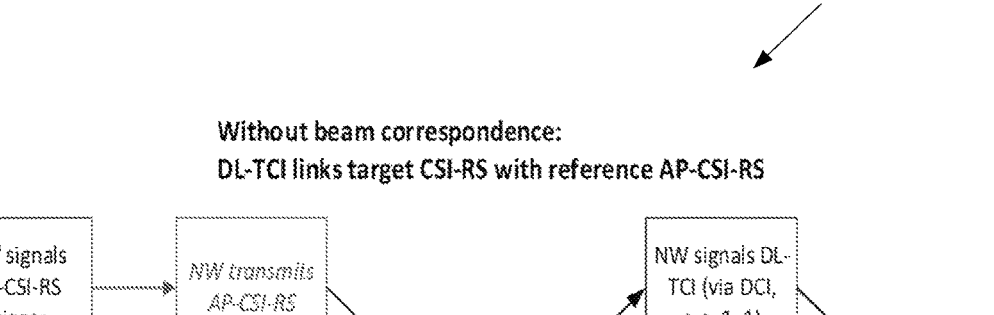
FIG. 10 illustrates a downlink multi-beam operation according to embodiments of the present disclosure.
Figure 10:
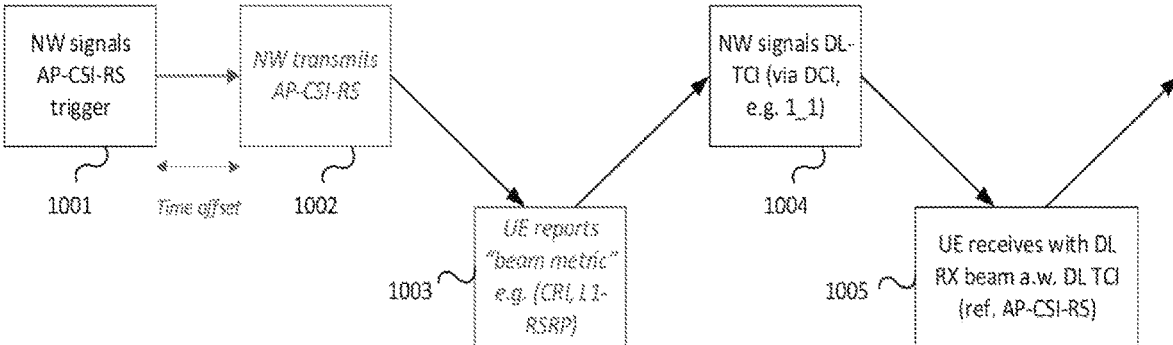

In one example illustrated in FIG. 10 (embodiment A-1), a DL multi-beam operation 1000 is shown. The embodiment of the DL multi-beam operation 1000 illustrated in FIG. 10 is for illustration only. FIG. 10 does not limit the scope of this disclosure to any particular implementation of the DL multi-beam operation 1000.

The DL multi-beam operation 1000 starts with the gNB/NW signaling to a UE an aperiodic CSI-RS (AP-CSI-RS) trigger or indication (step 1001). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB/NW can use the beam report to select an DL RX beam for the UE and indicate the DL RX beam selection (step 1004) using the DL-TCI field in the DL-related DCI (that carries the DL grant, such as DCI format 1_1 in NR). In this case, the DL-TCI indicates a reference RS (in this case, an AP-CSI-RS) representing the selected DL TX beam (by the gNB/NW). In addition, the DL-TCI can also indicate a "target" RS (e.g., CSI-RS) that is linked to the reference RS (in this case, an AP-CSI-RS). Upon successfully decoding the DL-related DCI with the DL-TCI, the UE selects an DL RX beam and performs DL reception (such as data reception via PDSCH) with the DL RX beam associated with the reference CSI-RS (step 1005).

For this embodiment (A-1), as described above, the UE selects the DL RX beam from the reference RS (in this case AP-CSI-RS) index signaled via the DL-TCI field. In this case, the CSI-RS resources (or, in general, the DL RS resources including CSI-RS, SSB, or a combination of the two) configured for the UE as the reference RS resources can be linked to (associated with) "beam metric" reporting such as CRI/L1-RSRP or L1-SINR.

In another example illustrated in FIG. 11 (embodiment A-2), a DL multi-beam operation 1100 is shown. The embodiment of the DL multi-beam operation 1100 illustrated in FIG. 11 is for illustration only. FIG. 11 does not limit the scope of this disclosure to any particular implementation of the DL multi-beam operation 1100.

The DL multi-beam operation 1100 starts with the gNB/NW signaling to a UE an aperiodic SRS (AP-SRS) trigger or request (step 1101). This trigger can be included in a DCI (either UL-related or DL-related). Upon receiving and decoding the AP-SRS trigger (step 1102), the UE transmits AP-SRS to the gNB/NW (step 1103) so that the NW (or gNB) can measure the UL propagation channel and select a DL RX beam for the UE for DL (assuming beam correspondence holds).

The gNB/NW can then indicate the DL RX beam selection (step 1104) using the DL-TCI field in the DL-related DCI (that carries the DL grant, such as DCI format 1_1 in NR). In this case, the DL-TCI indicates a reference RS (in this case, an AP-SRS) representing the selected DL RX beam. In addition, the DL-TCI can also indicate a "target" RS (e.g., CSI-RS) that is linked to the reference RS (in this case, an AP-SRS). Upon successfully decoding the DL-related DCI with the DL-TCI, the UE performs DL reception (such as data reception via PDSCH) with the DL RX beam indicated by the DL-TCI (step 1105).

For this embodiment (A-2), as described above, the UE selects the DL RX beam based on the UL TX beam associated with the reference RS (AP-SRS) index signaled via the DL-TCI field.

Likewise, for UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RSs (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

The following two embodiments (B-1 and B-2) are examples of UL multi-beam operations that utilize UL-TCI-based UL beam indication after the network (NW) receives some transmission from the UE. In the first example embodiment (B-1), aperiodic CSI-RS is transmitted by the NW and measured by the UE. This embodiment can be used, for instance, when reciprocity between the UL and DL beam-pair-link (BPL) holds. This condition is termed "UL-DL beam correspondence." In the second example embodiment (B-2), aperiodic SRS is triggered by the NW and transmitted by the UE so that the NW (or a gNB) can measure the UL channel quality for the purpose of assigning an UL TX beam. This embodiment can be used whether UL-DL beam correspondence holds or not. Although aperiodic RS is used in these two examples, periodic or semi-persistent RS can also be used.

In another example illustrated in FIG. 12 (embodiment B-1), a UL multi-beam operation 1200 is shown. The embodiment of the UL multi-beam operation 1200 illustrated in FIG. 12 is for illustration only. FIG. 12 does not limit the scope of this disclosure to any particular implementation of the DL multi-beam operation 1200.

The UL multi-beam operation 1200 starts with the gNB/NW signaling to a UE an aperiodic CSI-RS (AP-CSI-RS) trigger or indication (step 1201). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1202), the UE measures the AP-CSI-RS and, in turn, calculates and reports a "beam metric" (indicating quality of a particular TX beam hypothesis) (step 1203). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB/NW can use the beam report to select an UL TX beam for the UE and indicate the UL TX beam selection (step 1204) using the UL-TCI field in the UL-related DCI (that carries the UL grant, such as DCI format 0_1 in NR). In this case, the UL-TCI indicates a reference RS (in this case, an AP-CSI-RS) representing the selected UL RX beam (by the gNB/NW). In addition, the UL-TCI can also indicate a "target" RS (e.g., SRS) that is linked to the reference RS (in this case, an AP-CSI-RS). Upon successfully decoding the UL-related DCI with the UL-TCI, the UE selects an UL TX beam and performs UL transmission (such as data transmission on PUSCH) with the UL TX beam associated with the reference CSI-RS (step 1205).

For this embodiment (B-1), as described above, the UE selects the UL TX beam based on the derived DL RX beam associated with the reference RS index signaled via the UL-TCI field. In this case, the CSI-RS resources (or, in general, the DL RS resources including CSI-RS, SSB, or a combination of the two) configured for the UE as the reference RS resources can be linked to (associated with) "beam metric" reporting such as CRI/L1-RSRP or L1-SINR.

In another example illustrated in FIG. 13 (embodiment B-2), an UL multi-beam operation 1300 is shown. The embodiment of the UL multi-beam operation 1300 illustrated in FIG. 13 is for illustration only. FIG. 13 does not limit the scope of this disclosure to any particular implementation of the UL multi-beam operation 1300.

The UL multi-beam operation 1300 starts with the gNB/NW signaling to a UE an aperiodic SRS (AP-SRS) trigger or request (step 1301). This trigger can be included in a DCI (either UL-related or DL-related). Upon receiving and decoding the AP-SRS trigger (step 1302), the UE transmits AP-SRS to the gNB/NW (step 1303) so that the NW (or gNB) can measure the UL propagation channel and select an UL TX beam for the UE.

The gNB/NW can then indicate the UL TX beam selection (step 1304) using the UL-TCI field in the UL-related DCI (that carries the UL grant, such as DCI format 0_1 in NR). In this case, the UL-TCI indicates a reference RS (in this case, an AP-SRS) representing the selected UL TX beam. In addition, the UL-TCI can also indicate a "target" RS (e.g., SRS) that is linked to the reference RS (in this case, an AP-SRS). Upon successfully decoding the UL-related DCI with the UL-TCI, the UE performs UL transmission (such as data transmission on PUSCH) with the UL TX beam indicated by the UL-TCI (step 1305).

For this embodiment (B-2), as described above, the UE selects the UL TX beam from the reference RS (in this case SRS) index signaled via the UL-TCI field.

In one example E0, the DL (or UL) TCI state indication is performed in two steps.

Step 1: a set of K1>1 DL (or UL) TCI states is configured via higher-layer (RRC) signaling.

Step 2: a DL (or UL) TCI state is activated (or selected) from the configured set of K1 DL (or UL) TCI states via MAC-CE activation command.

In one example E1, the DL (or UL) TCI state indication is performed in two steps.

Step 1: a set of K1>1 DL (or UL) TCI states is configured via higher-layer (RRC) signaling.

Step 2: a DL (or UL) TCI state is indicated from the configured set of K1 DL (or UL) TCI states via DCI signaling.

In one example E2, the DL (or UL) TCI state indication is performed in three steps.

Step 1: a set of K1>1 DL (or UL) TCI states is configured via higher-layer (RRC) signaling.

Step 2: a subset of K2<K1 DL (or UL) TCI states is activated (or selected) from the configured set of K1 DL (or UL) TCI states via MAC-CE activation command.

Step 3: a DL (or UL) TCI state is indicated from the activated set of K2 DL (or UL) TCI states via DCI signaling.

In one example, the maximum value of K1=128. In one example, the value of K2 in example E2 is 8. Note that E0 is a special case of E2 when K2=1. In examples E0 and E2, the overhead of MAC-CE based activation could be very large if DL (or UL) TCI states are indicated for multiple CCs/BWPs independently. The present disclosure includes a few example embodiments for MAC-CE overhead reduction for this case. In one example, UL TCI is equivalently replaced with SpatialRelationInfo for UL beam indication for SRS, UL DMRS, PUCCH, or PUSCH transmission.

Let N be the number of CCs/BWPs the UE is configured with for the DL (or UL) beam indication via DL (or UL) TCI indication.

In embodiment 1, a UE is configured/indicated with only one MAC-CE activation command that activates a common (or same) set of DL (or UL) TCI state IDs (comprising K2 TCI states) or SpatialRelationInfo for all active CCs/BWPs. Since there is only one set of TCI states activated for all CCs/BWPs, the overhead of MAC-CE activation can be reduced significantly when compared with MAC-CE activation command for each CC/BWP independently/separately. Such common activation can be restricted to PDSCH (for DL) or PUSCH (for UL). Alternatively, the common activation can be used for other channels such as PDCCH (i.e., TCI states for CORESETs) and PUCCH, or DL RSs such as DL DMRS and CSI-RS, UL RSs such as UL DMRS and SRS. Note that the same common set of TCI-state IDs are applied for all the BWPs in the indicated CCs.

When such common activation is used for PDCCH, a UE is configured/indicated with only one MAC-CE activation command that activates a common (or same) DL TCI state ID (i.e., K2=1) for a CORESET for all active CCs/BWPs.

When such common activation is used for PUCCH, a UE is configured/indicated with only one MAC-CE activation command that activates a common (or same) UL TCI state ID (i.e., K2=1) or SpatialRelationInfo for PUCCH for all active CCs/BWPs.

When a SpatialRelationInfo is activated for a semi-persistent (SP) or aperiodic SRS (AP-SRS) resource by a MAC CE for a set of CCs/BWPs, the SpatialRelationInfo is applied for the SP/AP-SRS resource(s) with the same SRS resource ID for all the BWPs in the indicated CCs.

The set of K1 TCI states (Step 1 in example E0/E2) can be separately configured for each CC/BWP and the common set of K2 TCI states is activated (in Step 2) for all CCs/BWPs. Alternatively, the set of K1 TCI states (Step 1 in example E0/E2) can also be configured common for all CCs/BWPs.

Whether the UE is capable of supporting such common MAC-CE activation for TCI indication can be reported by the UE via capability signaling.

The QCL-type can be fixed to be QCL-TypeD for such common activation. Also, the same QCL-TypeD resource signal (RS) can be configured for same TCI state ID for all BWPs/CCs.

In one example, the MAC-CE activation mechanism can be used to activate the same set of TCI state IDs for all active BWPs in the same band (e.g., EN-DC, NE-DC, NR-DC in the 3GPP NR specification) or cell group(s) on a frequency band of FR2. The MAC-CE activation command can be received on any active BWP in a band or cell group(s), and the indicated activated TCI state IDs are applied to every active BWP in that band or cell group(s).

In another example, the MAC-CE activation mechanism can be used to activate the same set of TCI state IDs for an active BWP of the CC indicated by the MAC-CE to be applied to all active BWPs in same band or cell group(s) on a frequency band of FR2. The QCL-type can either be QCL-TypeD or QCL-TypeA for such common activation. The QCL Type A RS(s) applied to each CC/BWP is that corresponding to the same resource ID(s) indicated by the TCI state IDs.

In embodiment 1A, a UE is configured/indicated with one MAC-CE activation command that activates a common (or same) set of DL (or UL) TCI state IDs or (comprising K2 TCI states) or SpatialRelationInfo for $N_1$<N active CCs/BWPs (comprising a first subset of CCs/BWPs), and N2=N–N1 separate MAC-CE activation commands to activate a set of DL (or UL) TCI state IDs or SpatialRelationInfo for each active CC/BWP of a second subset of CCs/BWPs. Since there is only one set of TCI states or SpatialRelationInfo activated for CCs/BWPs comprising the first subset, the overhead of MAC-CE activation can be reduced significantly when compared with MAC-CE activation command for each CC/BWP independently/separately. Note that the total number of MAC-CE activation commands are 1+N2. Also note that $N_2$ can be zero if $N_1$=N. The applicable list of CCs/BWPs comprising the first subset is determined according to at least one of the following alternatives.

In one alternative Alt 1A-0: the applicable list of CCs/BWPs is fixed, e.g., based on a fixed rule/condition.

In one alternative Alt 1A-1: the applicable list of CCs/BWPs is indicated by the common MAC CE activation command that activates the common (or same) set of DL (or UL) TCI state IDs for $N_1$ active CCs/BWPs.

In one alternative Alt 1A-2: the applicable list of CCs/BWPs is indicated by RRC signaling.

In one alternative Alt 1A-3: there are up to M lists of CCs/BWPs that can be configured by RRC signaling, and when M>1, the applied list of CCs/BWPs is determined by the indicated CC/BWP in the MAC CE activation command. In one example, M=2. In one example, there is no overlap (i.e., no CC/BWP is common) between M RRC-configured lists of CCs/BWPs. In another example, there can be overlap (i.e., at least one CC/BWP can be common) between M RRC-configured lists of CCs/BWPs.

In general, a UE is configured/indicated with one MAC-CE activation command that activates a common (or same) set of DL (or UL) TCI state IDs (comprising K2 TCI states) for $N_{1,1}$<N active CCs/BWPs (comprising a first subset of CCs/BWPs), a common (or same) set of DL (or UL) TCI state IDs (comprising K2 TCI states) for $N_{1,2}$<N active CCs/BWPs (comprising a second subset of CCs/BWPs), and so on up to K subsets, where such that $N_1=\Sigma_{i=1}^{K} N_{1,i}$, and N2=N−N1 separate MAC-CE activation commands to activate a set of DL (or UL) TCI state IDs for each active CC/BWP of a (k+1)-th subset of CCs/BWPs. Note that the total number of MAC-CE activation commands are K+N2. Also note that $N_2$ can be zero if $N_1$=N. In one example, K=2 and $N_2$=0. In another example, the number of common activation commands (K) equals a number of frequency-contiguous CCs/BWPs from the total of N CCs/BWPs, where each frequency-contiguous CC/BWP has at least two CC/BWP. Each of the applicable lists of CCs/BWPs comprising the K subsets are determined according to at least one of the Alt 1A-0 through Alt 1A-3.

In embodiment 2, a UE is configured/indicated with either (a) one common MAC-CE activation command that activates a common (or same) set of DL (or UL) TCI state IDs or SpatialRelationInfo for all active CCs/BWPs (according to embodiment 1) or one common activation for each of the one or multiple subsets of CCs/BWPs (cf. embodiment 1A), or (b) N MAC-CE activation commands, where each activation command independently/separately activates a set of DL (or UL) TCI state IDs for each active CC/BWP.

Whether the MAC-CE activation is according to (a) or (b) is based on a fixed condition.

In one example 2-1, the fixed condition is based on the value N. For example, the activation is according to (a) if N>x, and according to (b) if N<=x, where x is a fixed number. Or, for example, the activation is according to (a) if N>=x, and according to (b) if N<x, where x is a fixed number.

In one example 2-2, the fixed condition is based on the separation (distance), denoted as Z, between CCs or BWPs, where the separation (distance) between two CCs or BWPs can be defined (in RBs or other frequency domain units) as the absolute value of the difference of reference points in the two CCs or BWPs, and a reference point of a CC or BWP can be the starting RB index of the CC or BWP. For example, the activation is according to (a) if Z<=y, and according to (b) if Z>y, where y is a fixed number. Or, for example, the activation is according to (a) if Z<y, and according to (b) if Z>=y, where y is a fixed number.

In one example 2-3, the fixed condition is based on the value N and the separation (distance), denoted as Z, between CCs or BWPs. For example, the activation is according to (a) if N>x and Z<=y, and according to (b) otherwise, where x and y are fixed numbers.

In one example 2-4, the fixed condition is that the common MAC-CE based activation (cf. embodiment 1 or 1A) is applied only to the intra-band carrier aggregation (CA), i.e., CCs within the same frequency band are aggregated (e.g., EN-DC, NE-DC, NR-DC in 3GPP NR specification), where the aggregated CCs are contiguous. For instance, such common MAC-CE activation is applied only when a UE is configured to operate with carrier aggregation over a set of cells in a frequency band of FR2 or with frequency-contiguous carrier aggregation over a set of cells in a frequency band of FR1.

In one example 2-5, the fixed condition is that the common MAC-CE based activation (cf. embodiment 1 or 1A) is applied only to the intra-band carrier aggregation (CA), i.e., CCs within the same frequency band are aggregated (e.g., EN-DC, NE-DC, NR-DC in 3GPP NR specification), where the aggregated CCs are contiguous or non-contiguous. For instance, such common MAC-CE activation is applied only when a UE is configured to operate with carrier aggregation over a set of cells in a frequency band of FR2 or with frequency-contiguous or frequency-non-contiguous carrier aggregation over a set of cells in a frequency band of FR1.

In one example 2-6, the fixed condition is based on the value N and the condition in example 2-4 or 2-5. For example, the activation is according to (a) if N>x and the condition in example 2-4 or 2-5 is met, and according to (b) otherwise, where x is a fixed number. Or, for example, the activation is according to (a) if N>=x and the condition in example 2-4 or 2-5 is met, and according to (b) otherwise, where x is a fixed number. In one example, x equals the maximum number of CCs/BWPs the UE can be configured with. In another example, x is reported by the UE via capability signaling (either jointly with or separately from other capability signaling).

In one example 2-7, the fixed condition is that the common MAC-CE based activation (cf. embodiment 1 or 1A) is applied to the intra-band carrier aggregation (CA) always regardless of the frequency range FR1 or FR2, but applied to the inter-band CA only when the frequency range is FR1. Note that CCs belong to the same operating frequency band in case of intra-band CA, and CCs belong to different operating frequency bands in case of inter-band CA.

In example 2-8, the fixed condition is that the common MAC-CE based activation (cf. embodiment 1 or 1A) is applied to both intra-band carrier aggregation (CA) and the inter-band CA always regardless of the frequency range FR1 or FR2, but it is subject to a condition that whether the set of TCI-state IDs (or the TCI-state ID) refers to the same set of TCI states (spatial TX filters) for different CCs or not. A few examples of the condition are as follows.

In one example Ex 2-8-1: When the activation of the common (or same) set of DL TCI state IDs via MAC CE is for PDSCH, where the same set of TCI-state IDs is applied for all the BWPs in the configured CCs, for the inter-band CA case, depending on the TCI state definition across different CCs (configured via RRC), the same set of TCI-state IDs may not refer to the same set of TCI states (spatial TX filters) for different CCs.

For example, when the TCI state definition across different CCs (configured via RRC) can be (or are) different, then the same set of TCI-state IDs may or may not refer to the same set of TCI states (spatial TX filters) for different CCs.

For example, when the TCI state definition across different CCs (configured via RRC) can be (or are) different, then the same set of TCI-state IDs does not refer to the same set of TCI states (spatial TX filters) for different CCs.

For example, when the TCI state definition across different CCs (configured via RRC) are the same, then the same set of TCI-state IDs may or may not refer to the same set of TCI states (spatial TX filters) for different CCs.

For example, when the TCI state definition across different CCs (configured via RRC) are the same, then the same set of TCI-state IDs refers to the same set of TCI states (spatial TX filters) for different CCs.

For the intra-band CA case, depending on the TCI state definition across different CCs (configured via RRC), the same set of TCI-state IDs may not refer to the same set of TCI states (spatial TX filters) for different CCs.

For example, when the TCI state definition across different CCs (configured via RRC) can be (or are) different, then the same set of TCI-state IDs may or may not refer to the same set of TCI states (spatial TX filters) for different CCs.

For example, when the TCI state definition across different CCs (configured via RRC) can be (or are) different, then the same set of TCI-state IDs does not refer to the same set of TCI states (spatial TX filters) for different CCs.

For example, when the TCI state definition across different CCs (configured via RRC) are the same, then the same set of TCI-state IDs may or may not refer to the same set of TCI states (spatial TX filters) for different CCs.

For example, when the TCI state definition across different CCs (configured via RRC) are the same, then the same set of TCI-state IDs refers to the same set of TCI states (spatial TX filters) for different CCs.

In one example Ex 2-8-2: When the activation of the common (or same) DL TCI state ID via MAC CE is for a CORESET, where the same TCI-state ID is applied for the all BWPs in the configured CCs, for the inter-band CA case, depending on the TCI state definition across different CCs (configured via RRC), the same TCI-state ID may not refer to the same TCI state (spatial TX filter) for different CCs.

For example, when the TCI state definition across different CCs (configured via RRC) can be (or are) different, then the same TCI-state ID may or may not refer to the same TCI state (spatial TX filter) for different CCs.

For example, when the TCI state definition across different CCs (configured via RRC) can be (or are) different, then the same TCI-state ID does not refer to the same TCI state (spatial TX filter) for different CCs.

For example, when the TCI state definition across different CCs (configured via RRC) are the same, then the same TCI-state ID may or may not refer to the same TCI state (spatial TX filter) for different CCs.

For example, when the TCI state definition across different CCs (configured via RRC) are the same, then the same TCI-state ID refers to the same TCI state (spatial TX filter) for different CCs.

For the intra-band CA case, depending on the TCI state definition across different CCs (configured via RRC), the same TCI-state ID may not refer to the same TCI states (spatial TX filters) for different CCs.

For example, when the TCI state definition across different CCs (configured via RRC) can be (or are) different, then the same TCI-state ID may or may not refer to the same TCI state (spatial TX filter) for different CCs.

For example, when the TCI state definition across different CCs (configured via RRC) can be (or are) different, then the same TCI-state ID does not refer to the same TCI state (spatial TX filter) for different CCs.

For example, when the TCI state definition across different CCs (configured via RRC) are the same, then the same TCI-state ID may or may not refer to the same TCI state (spatial TX filter) for different CCs.

For example, when the TCI state definition across different CCs (configured via RRC) are the same, then the same TCI-state ID refers to the same TCI state (spatial TX filter) for different CCs.

Note that CCs belong to the same operating frequency band in case of intra-band CA, and CCs belong to different operating frequency bands in case of inter-band CA.

Alternatively, whether the MAC-CE activation is according to (a) or (b) is configured either implicitly (via other existing configuration or/and indication or/and activation command received by the UE) or explicitly (via a separate 'new' configuration or/and indication or/and activation command).

In embodiment 3, whether the UE is capable of supporting such common MAC-CE activation for TCI indication (cf. embodiment 1-3) or SpatialRelationInfo indication can be reported by the UE via capability signaling. Additionally, the applicable list of frequency bands supporting this feature can also be included in the UE capability signaling.

FIG. 14 illustrates a flow chart of a method 1400 for operating a user equipment (UE), as may be performed by a UE such as UE 116, according to embodiments of the present disclosure. The embodiment of the method 1400 illustrated in FIG. 14 is for illustration only. FIG. 14 does not limit the scope of this disclosure to any particular implementation.

As illustrated in FIG. 14, the method 1400 begins at step 1402. In step 1402, the UE (e.g., 111-116 as illustrated in FIG. 1) receives configuration information including a list of component carriers (CCs) and at least K transmission configuration indicator (TCI) states, wherein K>1 and each TCI state includes a TCI state identifier (ID) and a quasi co-location information (QCL-Info).

In step 1404, the UE receives an activation command via medium access control-control element (MAC-CE) to activate N TCI state IDs from K TCI state IDs, wherein N<K and the activation command is common across the list of CCs.

In step 1406, the UE determines a TCI state $T_i$ for a CC i in the list of CCs based on the activated N TCI state IDs.

In step 1408, the UE transmits an uplink (UL) transmission or receives a downlink (DL) transmission for the CC i based on a QCL-Info included in the determined TCI state $T_i$.

In one embodiment, at least K TCI states are configured separately for each CC in the list of CCs via higher layer signaling, and the activation command activates the same set of N TCI state IDs across the at least K TCI states for all CCs.

In one embodiment, for receiving physical downlink control channel (PDCCH) in the DL transmission, N=1, and the determined TCI state $T_i$ includes the activated TCI state ID.

In one embodiment, for receiving physical downlink shared channel (PDSCH) in the DL transmission, a value of N can be up to 8, the activated N TCI state IDs map to codepoints of a TCI field, and the UE further receives a codepoint of the TCI field in downlink control information (DCI) transmitted via physical downlink control channel (PDCCH), and determines the TCI state $T_i$ whose TCI state ID is mapped to the received codepoint of the TCI field.

In one embodiment, for transmitting at least one sounding reference signal (SRS) resource in the UL transmission, N=1, and the determined TCI state $T_i$ includes the activated TCI state ID.

In one embodiment, the list of CCs is: one of the M>1 lists of CCs configured by the higher layer signaling, where the M lists of CCs do not contain any common CC, and determined based on a CC index indicated in the activation command.

FIG. 15 illustrates a flow chart of another method 1500, as may be performed by a base station (BS) such as BS 102, according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the BS (e.g., 101-103 as illustrated in FIG. 1), generates configuration information including a list of component carriers (CCs) and at least K transmission configuration indicator (TCI) states, where K>1 and each TCI state includes a TCI state identifier (ID) and a quasi co-location information (QCL-Info).

In step 1504, the BS generates an activation command to activate N TCI state IDs from K TCI state IDs, where N<K and the activation command is common across the list of CCs.

In step 1506, the BS transmits the list of CCs and K TCI states.

In step 1508, the BS transmits the activation command via medium access control-control element (MAC-CE).

In step 1510, the BS receives an uplink (UL) transmission or transmits a downlink (DL) transmission for a CC i in the list of CCs based on a QCL-Info included in a TCI state $T_i$ determined for the CC i.

In one embodiment, at least K TCI states are configured separately for each CC in the list of CCs via higher layer signaling, and the activation command activates the same set of N TCI state IDs across the at least K TCI states for all CCs.

In one embodiment, for transmitting physical downlink control channel (PDCCH) in the DL transmission, N=1, and the determined TCI state $T_i$ includes the activated TCI state ID.

In one embodiment, for transmitting physical downlink shared channel (PDSCH) in the DL transmission, a value of N can be up to 8, the activated N TCI state IDs map to codepoints of a TCI field, and the transceiver is further configured to transmit a codepoint of the TCI field in downlink control information (DCI) transmitted via physical downlink control channel (PDCCH).

In one embodiment, for receiving at least one sounding reference signal (SRS) resource in the UL transmission, N=1, and the determined TCI state $T_i$ includes the activated TCI state ID.

In one embodiment, the list of CCs is: one of the M>1 lists of CCs configured by the higher layer signaling, where the M lists of CCs do not contain any common CC, and determined based on a CC index indicated in the activation command.

In one embodiment, the QCL-Info corresponds to a spatial domain filter associated with a beam to receive the UL transmission or transmit the DL transmission.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a processor; and
a transceiver coupled to the processor, the transceiver configured to:
   receive a radio resource control (RRC) message including information about a plurality of transmission configuration indicator (TCI) states;

receive a medium access control-control element (MAC-CE), including information activating a set of TCI states in the plurality of TCI states; and
   receive a downlink control information (DCI) including information about a TCI state in the set of TCI states,
wherein the MAC-CE is configured to activate the set of TCI states for indicated component carriers (CCs), and
wherein the indicated CCs corresponds to a first CC or a second CC.

2. The UE of claim 1, wherein the transceiver is configured to:
receive a message including a plurality of lists of CCs, and
wherein the first CC is a first subset list among the plurality of lists, and the second CC is a second subset list among the plurality of lists.

3. The UE of claim 1, wherein a set of TCI state identifiers (IDs) corresponding to the set of TCI states is applied for all downlink (DL) bandwidth parts (BWPs) or all uplink (UL) BWPs in the indicated CCs.

4. The UE of claim 1, wherein the information activating the set of TCI states is related to a physical downlink shared channel (PDSCH) reception.

5. The UE of claim 1, wherein:
the transceiver is configured to receive a MAC-CE related to a sounding reference signal (SRS),
the MAC-CE related to the SRS activates spatial relation information for a semi-persistent SRS resource or an aperiodic SRS resource for a set of CCs/BWPs, and
the spatial relation information is applied for the semi-persistent SRS resource or the aperiodic SRS resource with same SRS resource ID for all BWPs in the indicated CCs.

6. A base station (BS), the BS comprising:
a processor configured to:
   generate a radio resource control (RRC) message including information about a plurality of transmission configuration indicator (TCI) states;
   generate a medium access control-control element (MAC-CE) including information activating a set of TCI states in the plurality of TCI states; and generate downlink control information (DCI) including information about a TCI state in the set of TCI states;
wherein the MAC-CE is configured to activate the set of TCI states for indicated component carriers (CCs), and
wherein the indicated CCs corresponds to a first CC or a second CC;
a transceiver, operably coupled to the processor, the transceiver configured to:
transmit the RRC message;
transmit the MAC-CE; and
transmit the DCI.

7. The BS of claim 6, wherein:
the transceiver is configured to transmit a message including a plurality of lists of CCs; and
the first CC is a first subset list among the plurality of lists, and the second CC is a second subset list among the plurality of lists.

8. The BS of claim 6, wherein a set of TCI state identifiers (IDs) corresponding to the set of TCI states is applied for all downlink (DL) bandwidth parts (BWPs) or all uplink (UL) BWPs in the indicated CCs.

9. The BS of claim 6, wherein the information activating the set of TCI states is related to a physical downlink shared channel (PDSCH) reception.

10. The BS of claim 6 wherein:

the transceiver is configured to transmit a MAC-CE related to a sounding reference signal (SRS), the MAC-CE related to the SRS activates spatial relation information for a semi-persistent SRS resource or an aperiodic SRS resource for a set of CCs/BWPs, and the spatial relation information is applied for the semi-persistent SRS resource or the aperiodic SRS resource with same SRS resource ID for all BWPs in the indicated CCs.

11. A method for operating a user equipment (UE), the method comprising:

receiving a radio resource control (RRC) message including information about a plurality of transmission configuration indicator (TCI) states;

receiving a medium access control-control element (MAC-CE), including information activating a set of TCI states in the plurality of TCI states; and receiving a downlink control information (DCI) including information about a TCI state in the set of TCI states, wherein the MAC-CE is configured to activate the set of TCI states for indicated component carriers (CCs), and wherein the indicated CCs corresponds to a first CC or a second CC.

12. The method of claim 11, further comprising receiving a message including a plurality of lists of CCs, wherein the first CC is a first subset list among the plurality of lists, and the second CC is a second subset list among the plurality of lists.

13. The method of claim 11, wherein a set of TCI state identifiers (IDs) corresponding to the set of TCI states is applied for all downlink (DL) bandwidth parts (BWPs) or all uplink (UL) BWPs in the indicated CCs.

14. The method of claim 11, wherein the information activating the set of TCI states is related to a physical downlink shared channel (PDSCH) reception.

15. The method of claim 11, further comprising receiving a MAC-CE related to a sounding reference signal (SRS), wherein:

the MAC-CE related to the SRS activates spatial relation information for a semi-persistent SRS resource or an aperiodic SRS resource for a set of CCs/BWPs, and the spatial relation information is applied for the semi-persistent SRS resource or the aperiodic SRS resource with same SRS resource ID for all BWPs in the indicated CCs.

* * * * *